US008027807B2

(12) United States Patent
May et al.

(10) Patent No.: US 8,027,807 B2
(45) Date of Patent: Sep. 27, 2011

(54) DSL DIAGNOSIS EXPERT SYSTEM AND METHOD

(75) Inventors: Vernon May, Kerens, TX (US); Alberto Leyva, Coral Springs, FL (US)

(73) Assignee: Spirent Communications, Inc., Sunnyvale, CA (US)

( * ) Notice: Subject to any disclaimer, the term of this patent is extended or adjusted under 35 U.S.C. 154(b) by 404 days.

(21) Appl. No.: 12/264,866

(22) Filed: Nov. 4, 2008

(65) Prior Publication Data

US 2010/0114529 A1    May 6, 2010

(51) Int. Cl.
G06F 11/30 (2006.01)
H04L 27/00 (2006.01)
H04M 3/08 (2006.01)

(52) U.S. Cl. .................. 702/183; 370/351; 379/1.04
(58) Field of Classification Search .................. 702/183, 702/185; 370/351; 375/224; 379/1.04
See application file for complete search history.

(56) References Cited

U.S. PATENT DOCUMENTS

| 5,537,590 | A  | 7/1996 | Amado   |
| 7,350,106 | B2 | 3/2008 | Longere |
| 2004/0095921 | A1* | 5/2004 | Kerpez ........................ 370/351 |
| 2005/0175117 | A1  | 8/2005 | Wu et al. |
| 2008/0205501 | A1* | 8/2008 | Cioffi et al. ................. 375/224 |

OTHER PUBLICATIONS

"DSL Anywhere : A paper designed to provide options for Service Providers to extend the reach of DSL into previously un-served areas," white paper, DSL Forum, 2001, pp. 1-56.
Steinder, M. & Sethi, A.S. 2001, "The present and future of event correlation: A need for end-to-end service fault localization", World Multi-Conf. Systemics, Cybernetics, and Informatics, downloaded from Citeseer, pp. 124-129.
Cynthis S. Hood and Chuanyi Ji, Proactive Network Fault Detection, IEEE, 0-8186-7780-5/97, 1997, pp. 9
R.J. Allwood, C.N. Cooper, and A. Taylor, Diagnosing faults in a telecommunications network by an expert system, IEE Proceedings, vol. 137, Pt. I., No. 5, Oct. 1990, pp. 273-280.

* cited by examiner

*Primary Examiner* — Bryan Bui
(74) *Attorney, Agent, or Firm* — Haynes Beffel & Wolfeld LLP; Ernest J. Beffel, Jr.

(57) ABSTRACT

The present invention relates to diagnostic analysis of DSL circuits. In particular, it relates to methods and devices that use a rule base and automated test initiation, with excellent reduction in test technician involvement in trouble shooting, reduced truck rolls and more accurate identification of probably causes of customer complaints.

21 Claims, 8 Drawing Sheets

| Dispatch Number | Statistics | Probe | Probe - NAP | | | Probe | Probe/Stats | Narrowband | | |
|---|---|---|---|---|---|---|---|---|---|---|
| | Sync | DSLAM Sync | ATM Ping | ISP Authen | IP Site Ping | CPE Sync | Bit Rates Achieved | LL>1100 | LL<17,000 | Balace >90% |
| BRNA1 | Pass | Pass | Pass | Pass | Pass | Pass | Fail | Not App | Pass | Fail |
| BRNA2 | Pass | Pass | Pass | Pass | Pass | Pass | Fail | Not App | Pass | Fail |
| BRNA3 | Pass | Pass | Pass | Pass | Pass | Pass | Fail | Not App | Pass | Pass |
| CPE2 | Not App | Pass | Pass | Pass | Pass | Idle | Not App | Not App | Not App | Not App |
| CPE2 P1 | Not App | Pass | Pass | Pass | Not App | Idle | Not App | Not App | Pass | Not App |
| CPE2 P2 | Not App | Pass | Pass | Pass | Not App | Idle | Not App | Not App | Pass | Pass |
| CPE2 P3 | Not App | Pass | Pass | Pass | Not App | Idle | Not App | Not App | Pass | Pass |

| Dispatch Number | Narrowband | | Wideband | | | Probe/Stats | | DSLAM | | |
|---|---|---|---|---|---|---|---|---|---|---|
| | Res >150KOhm | Voltage <10VDC | No Load Coils | No Bridged Taps | No Noise | Atten >60 | Atteun >50 and <60 | CV's <2000 | ES's<4400 | LOS <+\=4 |
| BRNA1 | Not App | Not App | Not App | Pass | Pass | Not App | Not App | Not App | Not App | Not App |
| BRNA2 | Not App | Not App | Not App | Fail | Pass | Not App | Not App | Not App | Not App | Not App |
| BRNA3 | Pass | Pass | Not App | Fail | Not App | Not App | Not App | Not App | Not App | Not App |
| CPE2 | Not App | Not App | Not App | Not App | Not App | Not App | Not App | Not App | Not App | Not App |
| CPE2 P1 | Not App | Not App | Not App | Not App | Pass | Not App | Not App | Not App | Not App | Not App |
| CPE2 P2 | Not App | >=10 & <=24 | Not App | Not App | Not App | Not App | Not App | Not App | Not App | Not App |

| Dispatch Number | Resolution | Likely problem(s) | Title |
|---|---|---|---|
| BRNA1 | Capacitance Fault and no Bridged Tap. Recommend cutting the pair dead to the field at the Subscriber Serving Terminal: | Bit Rates Not Achieved<br>90% Remove End Section<br>10% Upgrade Modem | Cap Balance |
| BRNA2 | Capacitance Fault and Bridged Tap. Recommend removing the bridged tap and first and cutting the pair dead to the field at the Subscriber Serving Terminal Second: | Bit Rates Not Achieved<br>70% Remove Bridged Tap<br>30% Remove end section | Cap Balance Bridged Tap |
| BRNA3 | Bridged Tap Found and no noise. Recommend removing the bridged tap. Possible bridged tap found at XXXX feet.: | Bit Rates Not Achieved<br>80% CPE<br>20% Remove Bridged Tap | Bridged Tap |
| CPE2 | Circuit not in Sync and No CPE Modem Detected. Recommend veryifying with subscriber that Modem is plugged in. If so, warn of billing and dispatch to Customer Premises. | 100% Modem Not Connected. Contact Subscriber and Verify Connections to Modem. | CPE |
| CPE2 P1 | No Modem Seen and Balance Fault. Dipatch to cable and fix balance fault. | 80% Balance Fault<br>20% Defective CPE | Balance-CPE |
| CPE2 P2 | No Modem Seen and voltage Fault. Dipatch to cable and fix voltage fault. | 80% Voltage Fault<br>20% Defective CPE | Voltage-CPE |
| CPE2 P3 | No Modem Seen and resistance Fault. Dipatch to Customer Premise and fix resistance fault. | 80% Resitance Fault<br>20% Defective CPE | Resistance- CPE |

DSL DIAGNOSIS EXPERT SYSTEM AND METHOD

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to diagnostic analysis of DSL circuits. In particular, it relates to methods and devices that use a rule base and automated test initiation, with excellent reduction in test technician involvement in trouble shooting, reduced truck rolls and more accurate identification of probable causes of customer complaints.

DSL/ADSL has been available for several years. Access speeds via DSL, for some DSL implementations, rival cable modem speeds.

Diagnostics remain weak for tracking down logical and physical problems, many of which relate to repurposing the existing copper wiring from an analog voice system to a high speed digital distribution network. Weak diagnostics translate into expensive deployment for some percentage of converted lines and customer defection during trouble shooting. It is not unusual for a user to try twice or three times to get a problem resolution from their vendor and then, out of frustration, abandon DSL service in favor of a cable modem or a new triple play service. At that point, the DSL service provider has no way to recoup their deployment and troubleshooting investments and is unlikely to ever recapture the customer. The DSL service provider may also lose the opportunity to deliver voice or video products, because data service is increasingly bundled with the other services.

An opportunity arises to introduce improved DSL diagnostic methods and systems. Cheaper, faster, more reliable and generally better deployment and troubleshooting of DSL circuits may result.

SUMMARY OF THE INVENTION

The present invention relates to diagnostic analysis of DSL circuits. In particular, it relates to methods and devices that use a rule base and automated test initiation, with excellent reduction in test technician involvement in trouble shooting, reduced truck rolls and more accurate identification of probably causes of customer complaints. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Spirent has been involved with testing, including DSL fault diagnosis, for many years. Recent development efforts in DSL fault diagnosis have focused on systematic collection and analysis of test data, leading to a new understanding of how to troubleshoot DSL circuits.

The advent of new probes, such as COPPERMAX™ and IPMAX™ has substantially decreased the cost and increased the availability of circuit tests. These probes can be coupled to either Central Office (CO) DSLAMs or Remote Terminals ("RTs") to provide diagnosis of DSL circuits. Throughout this application and in the claims, unless we expressly distinguish between the DSL circuit drivers, we refer collectively to CO DSLAMs and RTs as "DSLAMs", to simplify our disclosure and claims.

The success of the new probes may lead to either new standards for providing physical and logical access by probes to DSL circuits through DSLAMs or may lead to ad hoc features from DSLAM suppliers that afford physical and/or logical access or that incorporate probes into DSLAMs. Throughout this application and in the claims, unless we expressly distinguish between add-on probes and native probes that are integrated into a DSLAM, we mean for "probe" to include devices added to legacy equipment and devices incorporated into new designs of DSLAMs, which have access to the DSL circuit for testing purposes.

Figure 1:
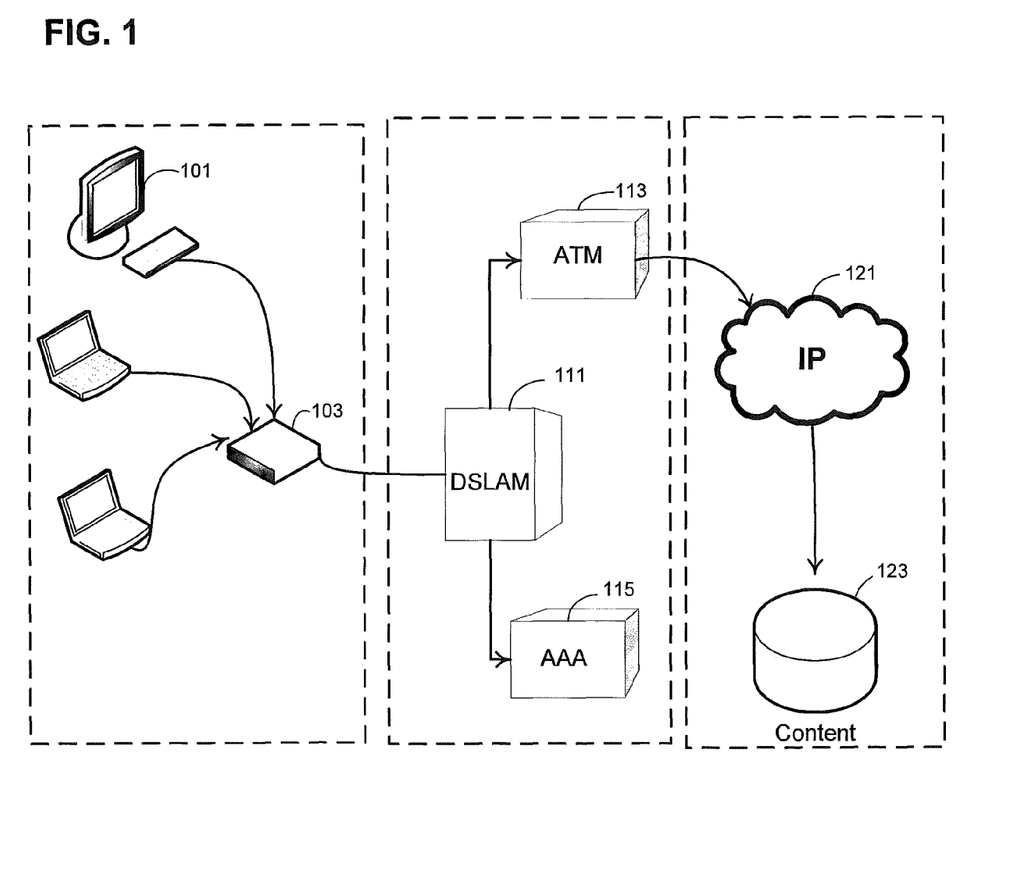
FIG. 1 depicts a DSL circuit as part of a network connected to the Internet.

FIG. 1 depicts a DSL circuit as part of a network connected to the Internet. Computers at the user's premises 101 connect to a DSL modem 103 that is often called "Customer Premises Equipment" or CPE. The connection may be direct or through access points, hubs, switches, routers or similar equipment. The DSL modem accepts Ethernet packets and encodes them according to one of several DSL modem protocols. The DSL modem communicates via a wire, typically 24 or 26 gauge copper, with a DSLAM 111 (inclusive of RTs). A DSLAM in a so-called Central Office ("CO") is typically connected to an Asynchronous Transfer Mode ("ATM") switch 113 and in turn to a network 121 such as a backbone network or the Internet. At the DSLAM or ATM switch, the service provider positions a so-called Authentication, Authorization and Accounting ("AAA") module 115. This module may be distributed across servers or may be a single server. One aspect of AAA is authorization of the DSL circuit by a Network Access Provider ("NAP") to access the Internet. For purposes of this application, we consider two slightly different terms to be synonymous with NAP: a Network Service Provider ("NSP") that provides services via the network and an Internet Service Provider ("ISP") also may implement authentication and/or authorization protocols that sometimes require troubleshooting. The network 121 allows the user's computers 101 to access content 123.

In FIG. 1, we see several elements that may require testing when a trouble ticket is opened on behalf of the user. The wire between the CPE and DSLAM, the so-called "loop", requires testing. The CPE and the DSLAM at opposite ends of the loop can be tested. The connection of the DSLAM to the ATM can be tested. Authorization from the AAA can be tested. Connection through the network to content sites can be tested.

Figure 2:
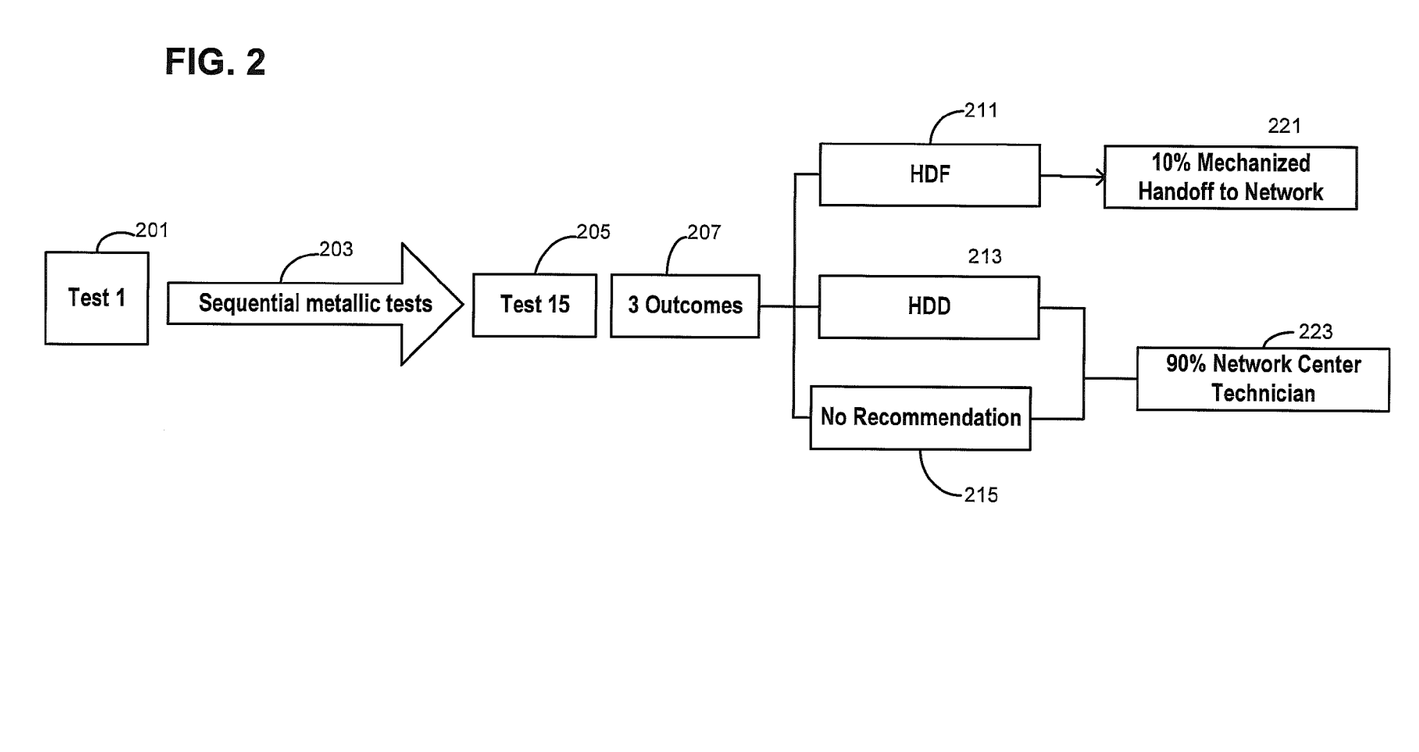
FIG. 2 depicts a prior art sequence of tests that a trouble shooter might initiate during or following a phone call from a user.

FIG. 2 depicts a prior art sequence of tests that a trouble shooter might initiate during or following a phone call from a user. The phone call from the user typically results in opening of a so-called trouble ticket. In the prior art, the trouble shooter might initiate a series of so-called metallic tests, depicted here 201, 203, 205 as tests 1-15. From this series of tests, data would produce one of three outcomes 207. The trouble shooter would either have a recommendation or not, and would either invoke a mechanized dispatch system 221 or a network technician 223. Spirent's survey indicated that 90 percent of the calls were directed to network technicians, even after the sequence of 15 metallic tests. Of the 90 percent, fully 68 percent of the calls reached network technicians without a recommendation or diagnosis, leaving the technicians to start the diagnostic process from scratch. Only 10 percent of the calls received mechanized dispatch.

Figure 3:
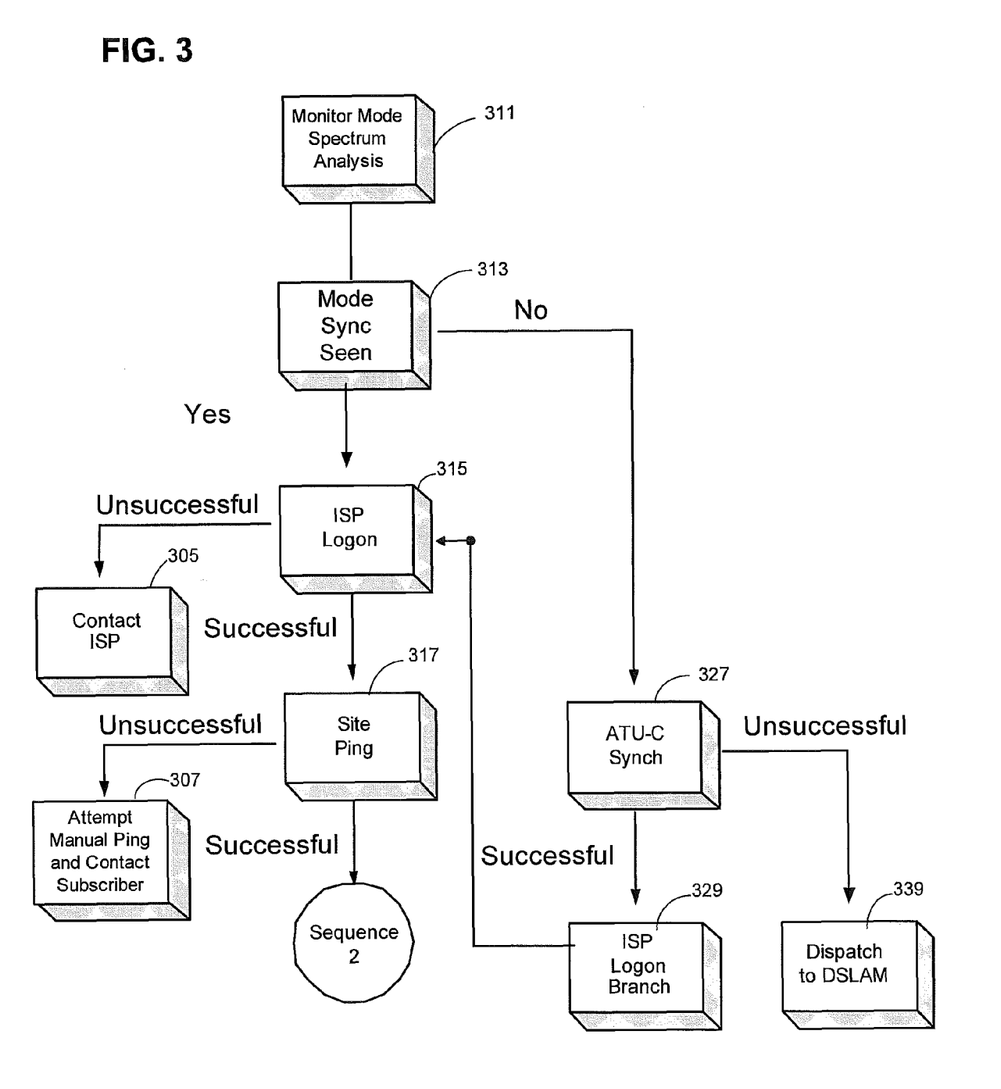
FIG. 3 illustrates part of a prior art protocol for a trouble shooter, beyond metallic tests.

FIG. 3 depicts part of a prior art protocol for a trouble shooter, beyond metallic tests. It includes both broadband tests 311, 313 and NAP connectivity tests 315, 317. Results of particular tests, e.g., 313, determine the flow of subsequent tests by a trouble shooter, e.g., 315 or 327. As this fragment of a test protocol reveals, branches sometimes loop back, e.g., 339 to 325, and the testing ends when potential one source of a problem is identified. Some of the outcomes, e.g., 315, lead to a separate provider 305. If the user is asked to contact the other provider, the DSL circuit provider may lose a customer in the process. The sequence of sequential tests is time consuming and confusing to follow.

Figure 4:
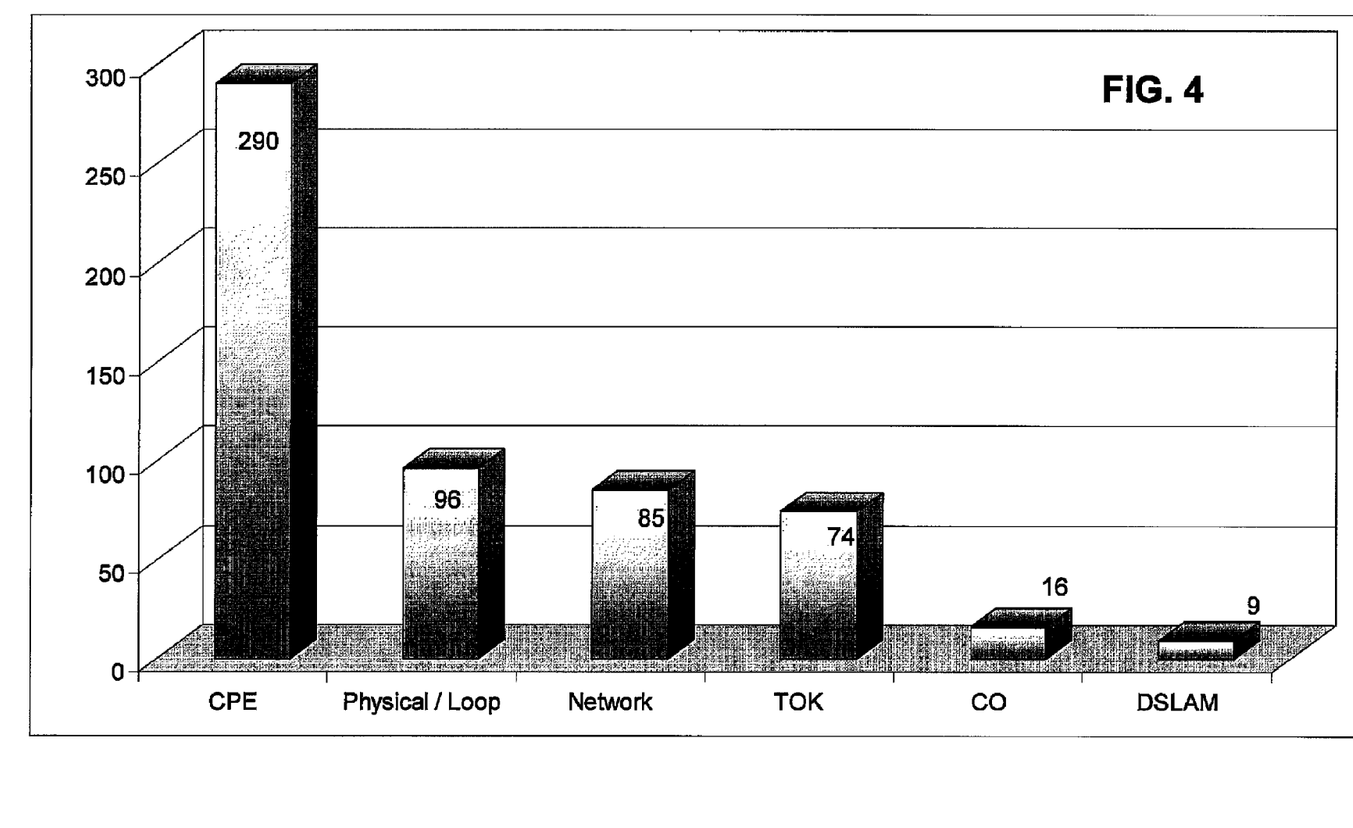
FIG. 4 illustrates an actual sample of trouble tickets, with the source of trouble revealed by a DSL service provider.

An actual sample of trouble tickets with a DSL service provider reported sources of trouble as illustrated in FIG. 4. Customer Premises Equipment problems were responsible for 51 percent of the calls. This equipment might be electronically reconfigured or swapped by the customer or by a technician visiting the premises. Physical or loop problems accounted for 17 percent of the calls. Typical problems include bridge taps, load coils, excessive loop length and cross-talk. Network problems (15 percent) refer to problems at the ATM connected to the DSLAM or downstream, such as authorization from the NAP or connection to Internet content. About 13 percent of the user calls resulted in the DSL circuit testing okay. Small percentages of the calls, three and two percent respectively, resulted from wiring problems in the central office and configuration problems in the DSLAM itself. In about 90 percent of the calls, this particular DSL service provider's software solution routed the call to a technician for handling. Very little automated dispatch resulted, as shown in FIG. 2.

Figure 5:
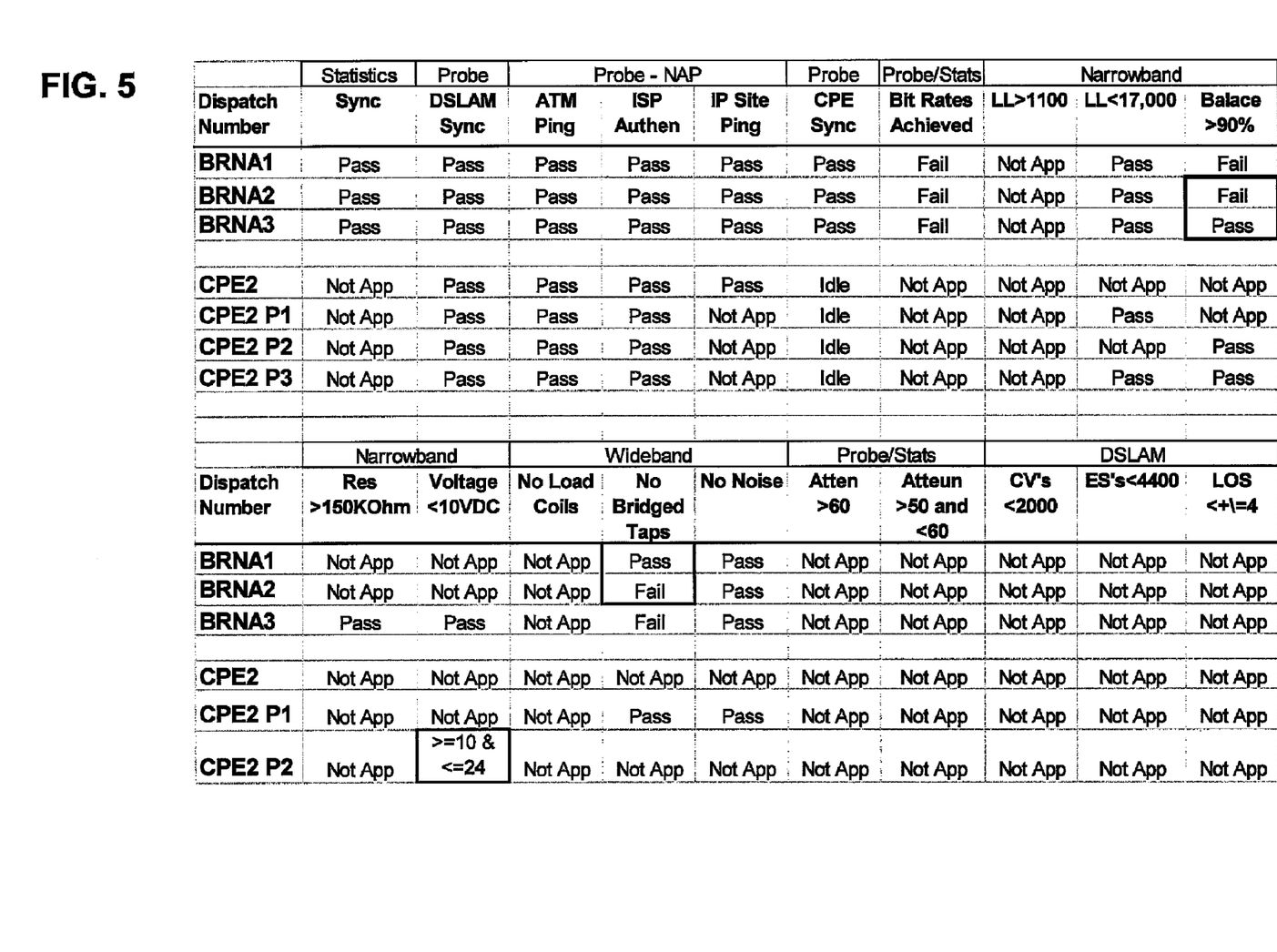
FIG. 5-6 depicts a few rows of data in a diagnostic rule base, which we call diagnostic vectors, and corresponding diagnoses.
Figure 6:
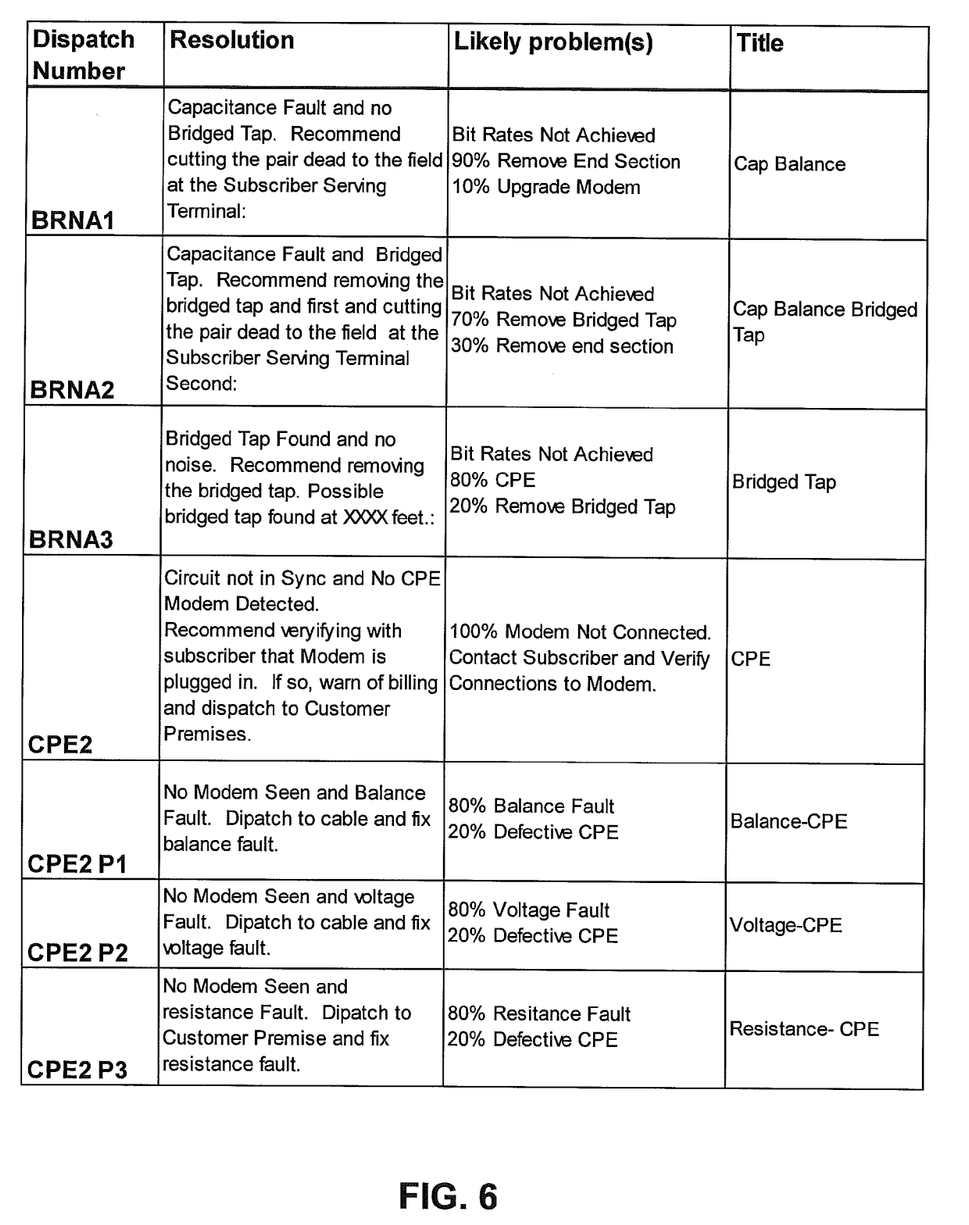

FIGS. 5-6 depict a few rows of data in a diagnostic rule base, which we call diagnostic vectors, and corresponding diagnoses. The attributes of a diagnostic vector can be values against which test results are compared, or a summary result from a test, such as "pass", "fail" or "not applicable." In the embodiment depicted, the columns in FIG. 5 generally represent tests and the cells represent result results. For instance, in the top table, the last three columns include the tests:

Loop length >1100 feet
Loop length <17,000 feet
Balance >90 percent

It is useful for xDSL services that the resistance to the flow of a current in a circuit (or impedance) to earth, for each conductor, is as equal as possible. This balance is known as longitudinal balance. When the line is balanced, there is no difference between the signals on the two conductors. The quality of the wiring plant can, in part, be determined with the standard tip-to-ring (T-R), tip-to-ground (T-G), and ring-to-ground (R-G) parameters including DC voltage and resistance along with AC voltage, resistance, and capacitance. The longitudinal balance measurements of the loop can be useful to ensure of efficient delivery of xDSL services. An unbalanced circuit caused by unbalanced longitudinal currents or power-line harmonics can cause crosstalk noise, causing bit errors that result in slower xDSL transmissions. One measure of balance involves the capacitance of line elements. tones out to 7 KHz can be used to measure impedance, which can be converted to capacitance. Capacitance T-G and R-G can then be compared to calculate balance. Capacitance measurements indicate the length of the circuit, which should be consistent with the estimated distance to the customer based on cable records, and the length of each leg, which provides an indication of the balance of the pair. A pair that is capacitively too short could have an open circuit on the pair; one that is too long may have a bridged tap. A pair that is not capacitively balanced could have a one-leg open circuit, as in the capacitance results table shown below.

| Pair | Capacitance | Length |
|------|-------------|--------|
| T-R  | 18.1 nF     | 1099 ft |
| T-G  | 19.3 nF     | 1004 ft |
| R-G  | 50.2 nF     | 2608 ft |

Each of these faults can be found by applying time domain reflectometry. Alternatively, a two port test of balance can be applied.

The counter example is in the bottom table, where an additional column regarding voltage would be required to express the boxed result in row CPE2 P2, which indicates a voltage greater than or equal to 9 volts and less than or equal to 24 volts is treated specially, and not simply as failing the less than 9 volts test.

Above the column headings is an indication of the data category and the data sources. Sync is a performance statistic obtained from the DSLAM. DSLAM Sync and CPE Sync are upstream and downstream synchronization statistics generated by the probe emulating devices at opposite ends of the circuit. ATM Ping, ISP Authentication and CPE Sync are network access provider tests performed by the probe. Bit rates achieved is a performance statistic that typically can be obtained from the DSLAM and/or probe. Narrowband statistics typically generated by the probe include loop length and line properties of balance, resistance and voltage. Wideband statistics typically generated by the probe include presence of load coils, presence of bridged taps, and presence of spectral noise. Additional measurements of signal attenuation typically can be obtained from the DSLAM and/or probe. The DSLAM provides performance statistics that count the number of code violations in a predetermined time period, which require application of error correction or retransmission to overcome, counts of errored seconds in a predetermined time period that may be different than the CV predetermined time periods, in which a retransmission to overcome an error also contains an error, and a count of loss of signal events in a predetermined time period that may be different than the other predetermined time periods.

In some embodiments, the test parameters are dynamically set based on information elicited regarding the intended DSL circuit. For instance, the target downstream bit rate of an ADSL circuit can be set to 1.5 MB, 3 MB or 6 MB. When judging whether a target bit rate is achieved, it is useful to know what the target actually is. This information is available from a profile stored by or for the DSLAM. Whether a bit rate test result is a "pass" depends on correctly setting the test parameters. An automated system is likely to be more reliable at setting such parameters than a manual system, which relies on an operator to select or enter the correct settings.

In FIG. 6, the dispatch numbers are correlated with likely problems and recommended short titles. Row BRNA1 presents a diagnosis of desired bit rates not achieved. Based on experience, this is usually (90%) resolved by cutting a dead pair of wires at the subscriber serving terminal and otherwise typically (10%) resolved by upgrading a DSL modem, the customer premises equipment.

Looking at FIGS. 5 and 6, one sees that row BRNA2 is distinguished from row BRNA1 by the result of testing for bridged taps: BRNA1 has no bridged tap and BRNA2 has one. Similarly, row BRNA2 is distinguished from row BRNA3 by the balance criteria: BRNA2 fails the balance test and BRNA3 passes. From the rows BRNA1, BRNA2 and BRNA3, one sees that it takes a combination of test results to distinguish among similar problems. This is more accurately done automatically using a rule base or a logic tree generated from a rule base than by attempting to construct a protocol diagram for a user to follow. The rule base approach has proven easier to develop and enhance than a logic tree or flow chart, which the rule base has replaced. At the same time, it should be recognized that the rule base that is represented by a table can be automatically converted into either a hierarchy or network of logical tests that are exactly equivalent to the rule base.

The order in which rules are processed in the rule base can be useful. The rows can be ordered so that the first diagnostic vector that matches a results vector, which represents the results of the tests, is selected to provide the diagnosis. Consider rows BRNA1, BRNA2 and BRNA3 in FIG. 5. The order in which these rows are tested does not matter, because there is a positive distinction among the rows that depends on the result of the balance test and the bridged tap tests. In contrast, among the four rows of CPE2 dispatches, the first CPE2 row is the residual diagnosis, if the DSL modem is not seen and no problems are detected with balance, voltage or resistance on the metal. If the CPE2 row were tested before CPE2 P1, for instance, a set of results could match the row, given the many "not applicable" cells in the row, even though further tests would suggest a different diagnosis and resolution. From this analysis of the rule base, we see that the rules can be ordered so that residual rules, for instance, with more "not applicable" cells, are tested after more specific rules. With such an ordering, the first rule or diagnostic vector to match a vector of results can be selected. Alternatively, all of a group of diagnostic vectors can be tested against the results vector and scored. Among diagnostic vectors that match the result vector, the one with the fewest "not applicable" cells or the most matches to "pass" cells can be selected.

One departure from past test protocols suggested in this disclosure is automatically launching many automated tests at the outset of a diagnostic session, instead of having a trouble shooter decide which tests to initiate. When probes are in place, the marginal cost of conducting a test can be small. (The probes have an initial cost, which has limited deployment, as of the date of this application.) The cost of conducting probe-based tests may be less than either the company's cost for an operator to be on the phone or the user's cost of interacting with the company. The cost of conducting tests is nearly always less than the cost of losing a customer. If a network technician is forced to respond to the user's call, conducting a test before connecting the call to the network technician will reduce the time spent by the technical expert. Results of applying this rule base suggest that escalating the trouble shooting from the operator to the expert by using results of the automated testing and diagnosis can be avoided in a large percentage of calls.

Processing the results of many simultaneous, apparently simultaneous tests or closely spaced tests is manageable using an automated system in much less time and with less chance of error than having a human follow a diagnostic protocol. The full rule base for DSL diagnosis includes over 60 alternative dispatch code combinations and even more codes for VDSL circuits. A partial flow chart that corresponds to this rule base covers a wall or fills dozens of pages in a book. An effort for a human to work through a diagnostic protocol represented by a flow chart corresponding to a base of 66 rules would frustrate the trouble shooter and/or the user, which is often the result in current DSL operations.

Automatically eliciting and receiving test results can, but does not necessarily, involve launching all tests simultaneously. If a user cannot connect to the Internet, the automated system may first test whether the consumer premises equipment, the CPE/DSL modem is visible to the DSLAM. This information may be available from DSLAM operating statistics or from a probe connected the DSL circuit that emulates the DSLAM to the CPE. If the DSL modem is, for instance, unplugged (FIG. 5, row CPE2), the problem may be resolved after exercising just a few tests. On the other hand, if a full range of tests is performed, problems that the user has not yet experienced may be detected and resolved, reducing the potential frustration of the user and loss of the customer. With experience gained from launching all or nearly all of the tests simultaneously, the frequency of multiple faults can be scored and compared to the marginal cost of running tests. As circumstances justify some sequencing of tests, they can be automatically sequenced and run, without waiting for decisions by the trouble shooter.

A subset of the present set of 66 diagnostic vectors was tested, as described above, with surprising success. This subset relied on only narrowband and wideband tests, whereas the full suite of available data includes performance data from the DSLAM, narrowband measurements, upstream and downstream synchronization data, wideband measurements, and network access provider connectivity tests. From a pattern of engaging network technicians in 90 percent of the calls, the requirement for engaging these experts dropped to just three percent of the calls! In an initial study of 320 trouble tickets, application of the technology disclosed produced mechanized handoffs in 54 percent of the calls. The handoffs were directed to nine distinct groups: ISP, ATM, IP network, cable repair, CPE dispatch, CO DSLAM wiring, change DSLAM profile, construction and engineering, or customer service to explain to the customer that the test results checked out the circuit as "okay." Either customer service representatives (43%) or network technicians (3%) handled the balance. It was very surprising that the involvement of network center and test technicians could be reduced so dramatically, given the number of years that DSL technology has been deployed.

Field studies also have shown that intermittent sync and failure to achieve target bit rates are well handled by the automated approach disclosed. In a study of about 650 circuits, about 75 circuits experienced intermittent sync problems. One-fifth of these intermittent sync problems resulted in either multiple dispatches or repeated reports. Fifteen percent (three-fourths of the number of chronic sync problems) were unresolved at the end of the study period. About 115 circuits failed to achieve the targeted bit rates. Of these, 22 percent resulted in either multiple dispatches or repeated reports. Eight percent (one-fourth of the number of chronic bit rate problems) were unresolved at the end of the study period. It is believed that nearly all of the intermittent sync and failure to achieve target bit rate problems were resolvable in the first instance by application of the technology disclosed. Given that DSL service has been available for the better part of a decade, the level of improvement demonstrated in this study indicates a remark advance in the art of diagnosing DSL circuits.

Figure 7:
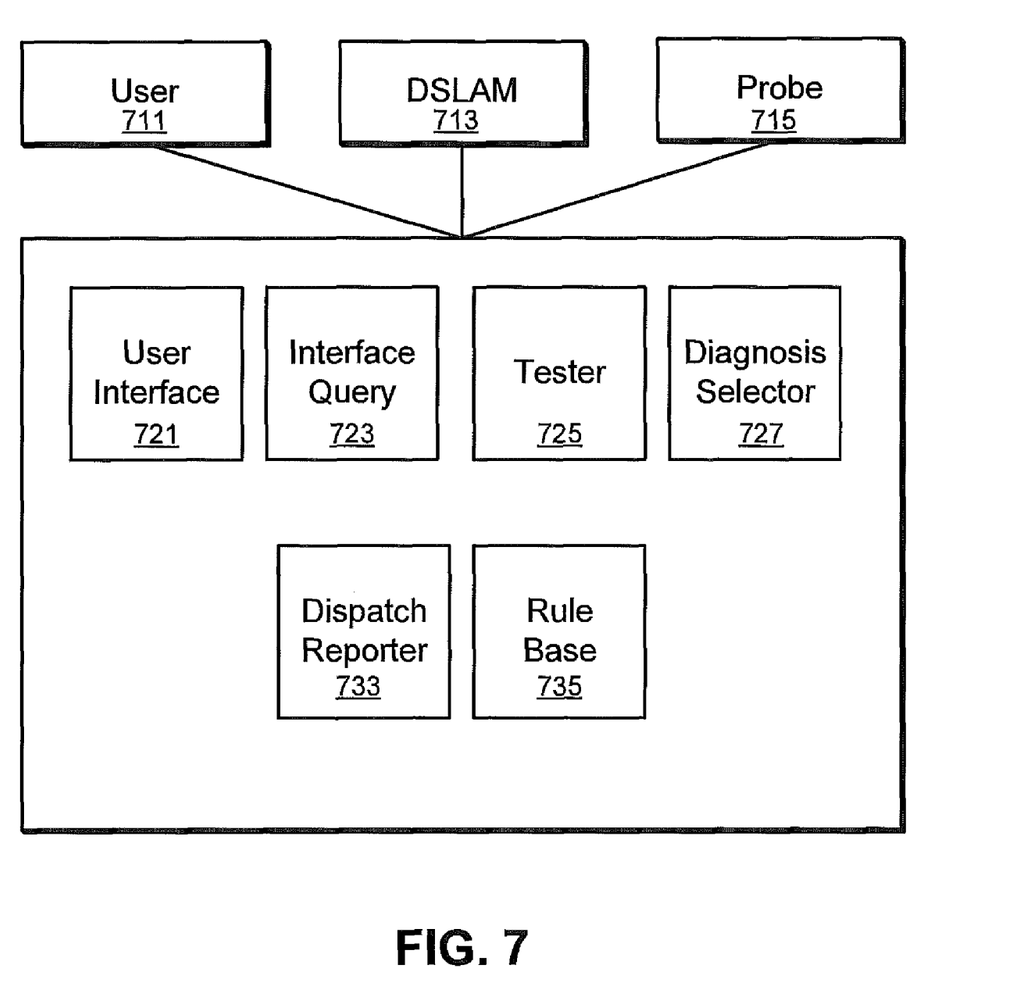
FIG. 7 is a block diagram of a computer implemented system that carries out DSL diagnostic methods.

FIG. 7 is a block diagram of a computer implemented system that carries out the methods described above. One environment in which the system is useful includes a user or computer process 711 that specifies at least one circuits be tested, a DSLAM 713 and DSL circuit to be tested, at least one probe 715 from which the system can elicit and receive test data for the DSL circuit and a user or computer system to its results can be reported. Components of the system include a user interface module 721 adapted to receive a DSL circuit identifier for a DSL circuit to be tested. They further include an interface query module 723 that queries the DSLAM or an associated component to receive interface data. They further include one or more tester modules 725 that elicit and receive narrowband measurement data, wideband measurement data, and network access provider connectivity data from the probe 715. In some embodiments, the network access provider connectivity test data may be omitted. A diagnosis selector module 727 is coupled to a rule base 735 stored in memory. The diagnosis selector module is adapted to compare a test results factor to diagnostic vectors in the rule base and select at least one diagnosis factor. A dispatch reporter module 733 is adapted to generate a dispatch report that may identify at least one most likely diagnosis and one or more potential actions to resolve the diagnosis. Variations on this system configuration follow variations on the diagnostic methods described herein. One variation includes an input component (e.g. 723) that receives DSL circuit identifications, a data collection (e.g. 725) component that interrogates the DSLAM and probe, a memory that stores test results at least temporarily and stores the diagnostic rule base (735), and an analysis and reporting component (727 & 733) that analyzes the test vectors against the diagnostic rule vectors, selects a diagnosis vector and reports the selected diagnostic vector and/or a diagnosis based on the selected diagnostic vector.

Figure 8:
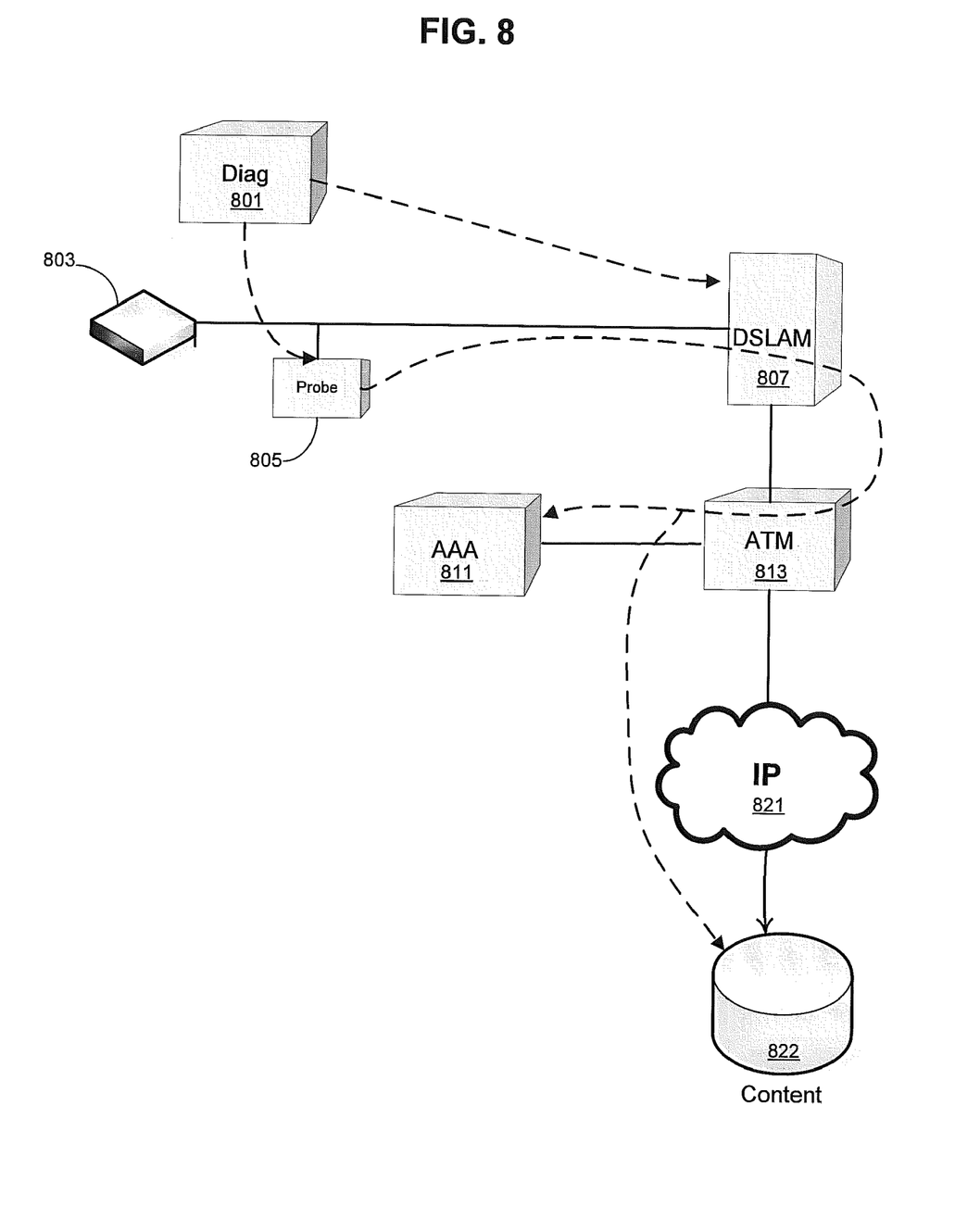
FIG. 8 depicts communication flow during diagnosis of network access provider issues.

FIG. 8 depicts communication flow during diagnosis of network access provider issues. The diagnostic system 801 is in communication with the DSLAM 807 and probe 805. The probe is coupled to consumer premises equipment 803, such as a DSL modem, and the DSLAM 807. The diagnostic communicates with the DSLAM to obtain interface data and communicates with the probe to receive additional data. The probe, for instance, communicates with the network component such as an ATM switch 813 by pinging the network component to confirm that he can be reached. The probe communicates with an access authentication component 811 to verify that authorization can be obtained to access content on a network. The probe contains a content provider 823, which may be accessed via the DSLAM 807, the network component 813 and the network 821. From FIG. 8, one can also see the paths for the probe to conduct narrowband and wideband tests directed both towards the consumer premises equipment 803 and the DSLAM 807.

Additional Detail Regarding the Rule Base

There are several major categories of diagnosis in the rule base:

BRNA: Dispositions associated with conditions causing Bit Rates to be low

CPE: Dispositions associated with conditions causing loop or customer modem issues NET: Dispositions associated with conditions causing network issues DSLAM: Dispositions associated with conditions causing DSALM failures P: Dispositions associated with conditions causing poor performance M: Dispositions associated with conditions causing electrical problems CO: Dispositions associated with central office wiring issues LC: Dispositions associated with load coil conditions TOK: Dispositions associated with test good conditions The major codes may appear alone or in combination. For a major code, there may be several distinct diagnoses. Some of the diagnostic codes and corresponding statements follow:

BRNA1: Capacitance Fault and no Bridged Tap. Recommend cutting the pair dead to the field at the Subscriber Serving Terminal BRNA2: Capacitance Fault and Bridged Tap. Recommend removing the bridged tap and first and cutting the pair dead to the field at the Subscriber Serving Terminal Second BRNA3: Bridged Tap Found and no noise. Recommend removing the bridged tap. Possible bridged tap found at XXXX feet.

BRNA4: Bridged Tap Found and DMT noise. Recommend removing the bridged tap. +BRNA.

BRNA5: Bridged Tap Found and Non DMT noise. Recommend Manual Split F Spectrum and Correlation. Consider changing binder groups. Possible bridged tap found at 268 feet.

BRNA6: Resistance Fault. Recommend dispatch to Subscriber Prem

BRNA7: No Bridged Tap Found and DMT noise. Recommend searching for noise in the binder group and bulk dispatch to a sheath or bonding fault BRNA8: No Bridged Tap Found and Non DMT noise. Recommend Manual Split F Spectrum and Correlation. Consider changing binder groups BRNA9: Attenuation causing lower Bit Rates. Recommend dispatch to NID and sync with Handheld BRNA10: Loop Length causing lower Bit Rates. Recommend dispatch to NID and sync with Handheld:

BRNA11: All tests pass, but Target Bit Rates not met. Suspect housewire or CPE

BRNA12: Voltage Fault. Recommend dispatch to Cable

DSLAM1: No DSLAM Sync. Recommend verifying provisioning or Changing Ports

DSLAM2: DSLAM Sync Marginal. Recommend Changing Ports

CPE1: CPE Sync Marginal. Recommend Changing Modems

CPE2: Circuit not in Sync and No CPE Modem Detected. Recommend verifying with subscriber that Modem is plugged in. If so, warn of billing and dispatch to Customer Prem CPE3: Circuit not in Sync and CPE Modem Detected. Recommend Handheld sync test at the NID and logical isolation.

Net1: Port is Isolated. Recommend check bulk tickets and verify provisioning of port Net2: Port is connected to network, but ISP Authentication Failed, Recommend Contacting ISP and verifying account.

Net3: Good through ISP. Site Ping failed. Recommend check for bulk network failure and manually attempt ping to "www.yahoo.com from desk computer". If manual ping fails, assume that the site is down.

P1: Circuit Performance OK, but Cap Bal Bad. If Dispatch Demanded, Recommend Dispatch Customer Premise.

P2: Circuit Performance OK, but Voltage fault present. If Dispatch Demanded, Recommend Dispatch Customer Premise P3: Circuit Performance OK, but Resistance fault present. If dispatch demanded, Recommend Dispatch Customer Premise.

P4: Circuit performance OK. T1 Noise Detected. If dispatch demanded Recommend Dispatch Customer Premise P5: Circuit performance OK. DMT Noise Detected. If dispatch demanded Recommend Dispatch Customer Premise P6: Attenuation cause by Excessive (>19KFT) loop length. If no sync at the NID, P7: Major Capacitance Fault Recommend Dispatch to Cable:

P8: Major Voltage fault present. Recommend Dispatch to Cable:

P9: Major Resistance fault present Recommend Dispatch Customer Premise:

TOK1: Circuit Performance OK, No Dispatch and Contact Subscriber

CO1: Either Port is not wired to MDF or port has been abandoned. Very that the port is still active. If no, dispatch to CO LC1: Device (probably Load Coil) detected, but not impacting service.

LC2: Device (probably Load Coil) detected. If no Sync at NID, look for Load Coils LC3: Device (probably Load Coil) detected. DSLAM or Test Head able to Sync, so load coil has no impact.

Some of the code combinations follow:

TOK1 LC1: Circuit Performance OK, No Dispatch and Contact Subscriber

P1 LC1: Circuit Performance OK, but Cap Bal Bad. If Dispatch Demanded, Recommend Dispatch Customer Premise.

P2 LC1: Circuit Performance OK, but Voltage fault present. If Dispatch Demanded, Recommend Dispatch Customer Premise P3 LC1: Circuit Performance OK, but Resistance fault present. If dispatch demanded, Recommend Dispatch Customer Premise.

P4 LC1: Circuit performance OK. T1 Noise Detected. If dispatch demanded Recommend Dispatch Customer Premise P5 LC1: Circuit performance OK. DMT Noise Detected. If dispatch demanded Recommend Dispatch Customer Premise CPE2 LC2: Circuit not in Sync and No CPE Modem Detected. Recommend verifying with subscriber that Modem is plugged in. If so, warn of billing and dispatch to Customer Prem CPE1 LC3: Circuit not in Sync and No CPE Modem Detected. Recommend verifying with subscriber that Modem is plugged in. If so, warn of billing and dispatch to Customer Prem CPE3 LC3: Circuit not in Sync and CPE Modem Detected. Recommend Handheld sync test at the NID and logical isolation.

CPE1 P6: CPE Sync Marginal. Recommend Changing Modems

CPE3 P6: Circuit not in Sync and CPE Modem Detected. Recommend Handheld sync test at the NID and logical isolation.

The details of dispatching may depend on the status of DSL provisioning. For instance, a DSLAM port ready for sync will, for some codes, be handled differently than a circuit in which logical and/or physical cross connections have been made.

The tests available include those represented by column heading in FIG. 5. These tests should be familiar to those of skill in the art, as we are not disclosing in this application any new test probe or device.

Sync refers to whether the DSLAM reports synchronization with the CPE.

DSLAM Sync refers to whether the probe reports being able to sync with the DSLAM, when the probe is emulating the CPE.

ATM Ping refers to whether the probe reports being able to ping an ATM switch in communication with the DSLAM.

ISP Authentication refers to whether the probe reports being able to pass authentication and/or authorization with an NAP, NSP or ISP, typically via an AAA module.

IP Site Ping refers to whether the probe reports being able to ping a web site, either by IP address or by DNS name resolution.

CPE Sync refers to whether the probe reports being able to sync with the CPE, when the probe is emulating the DSLAM.

Bit Rates Achieved refers to whether upstream and downstream data rates achieve target rates for a particular DSL circuit.

LL>1100 refers to whether the loop length of the DSL circuit is greater than 1100 feet.

LL<17,000 refers to whether the loop length of the DSL circuit is less than 17,000 feet.

Balance >90% refers to capacitance balance of the copper pair. One balance measurement is greater than 90% of the other balance measurement.

Res >150 KOhm refers to resistance on the copper pair is greater than 150,000 Ohms.

Voltage <10 VDC refers to voltage on the copper pair is less that 10 Volts DC. Variation, $10<=VDC<=24$ No Load Coils refers to whether load coils are detected on the loop.

No Bridged Taps refers to whether bridged taps are detected on the loop.

No Noise refers to whether spectral analysis finds QAM tones matching a reference or test pattern or whether additional energy is found in unexpected places. Note that T1 and ISDN interferers have different spectral characteristics that can be distinguished.

Attenuation >60 refers to signal decay, for instance due to distance or load coils, in excess of 60 dB RMS.

Attenuation >50 and <60 refers to signal decay, for instance due to distance or load coils, that reduces the signal received by 50 to 60 dB RMS.

CV's<2000 refers to coding violations less than 2000 in a 24 hr period.

ES's<4400 refers to errored seconds less than 4400 in a 24 hr period. Seconds are retransmissions of data.

LOS <+\=4 refers to Loss of signal less or equal to 4 times in a 24 hr period.

Among these test criteria, availability varies between typical DSLAM collected data and probe collected data (including add-on and integrated probes.) The data historically provided by DSLAMs includes statistics and performance data. Statistics may include Class of Service, DSL profile, Status, Upstream and Downstream measurements (Channel Bit Rate, Cells transmitted, Max Connection Speed, Min Connection Speed, Relative Capacity, Noise Margin, Transmitted Signal Power and Signal Attenuation), and Alarms. The DSLAM performance data may include Near End and Far End performance measurement of Loss of frame events, Loss of signal events, Code Violations, Discarded Cells due to HEC violations, Errored seconds and Forward Error corrections. Performance data further may include Loss of power and Loss of link events.

The data historically available from field tests and more recently available from probes includes Loop electrical signature analysis of Resistance, Capacitance, Voltage, Loop length and Balance. Wideband and narrowband analysis may include Spectrum analysis and correlation, Crosstalk disturbers detection, Time Domain Reflectrometry analysis, Load Coil detection and Bridged tap detection.

Probes provide an additional range of emulation and network connectivity tests. Probes can provide ATUR and ATUC real time emulation and sync analysis. Utilizing ATUR emulation, probes can report on DSLAM Sync to ATUC, Status, Link type, Channel Type, and Upstream and Downstream performance, including Data Rate (Kbps), Max rate (Kbps), Relative Capacity, Transmit Power (dBm), Attenuation (dB), and SNR margin (dB).

Utilizing ATUC emulation, probes can report on DSLAM Sync to ATUR, ATUR modem detection, Status, Link type, Channel Type, and Upstream and Downstream performance, including Data Rate (Kbps), Max rate (Kbps), Relative Capacity, Transmit Power (dBm), Attenuation (dB), SNR margin (dB).

One will notice that much of the performance data in upstream and downstream directions is available alternatively from the DSLAM and from probe emulation facing both directions of the DSL circuit.

Among the data described above, so-called narrowband test data may include voltage, capacitance, resistance, and load coil presence. So-called broadband test data may include spectrum analysis, time domain reflectometry, and cross talk analysis. NAP connectivity test data may include ATM Ping, ISP Authentication and IP Site Ping.

Some Particular Embodiments

The present invention may be practiced as a method or device adapted to practice the method. The invention may be an article of manufacture such as media impressed with logic to carry out computer-assisted diagnosis of DSL circuits.

One embodiment is an automated, computer implemented method of analyzing a DSL circuit. By DSL circuit we mean to include an ADSL, ADSL2+, BDSL2, VDSL or VDSL2 circuit and other circuit types in this family. The method typically is used in response to a trouble ticket from a customer but might as well be exercised if network monitoring detects a potential problem. The method includes receiving electronically a DSL circuit identification for a DSL circuit to be analyzed. The DSL circuit is coupled to a DSLAM, which, as indicated above, is a term that we use to include remote terminals (RTs). For the DSL circuit, the method includes automatically eliciting and electronically receiving a variety of data. Performance data is received from the DSLAM. Receiving data from the DSLAM, of course, includes receiving data either directly from the DSLAM or from an auxiliary piece of equipment that responds on behalf of the DSLAM to queries. The data elicited and received further includes narrowband measurement data, upstream and downstream synchronization data, and wideband measurement data. This data is received from at least one probe coupled to the DSL circuit.

In some embodiments, separate probes will provide separate categories of data. As described above, pilot studies have shown that the narrowband and wideband measurement data are sufficient to significantly improve on DSL circuit diagnosis, even without network access provider connectivity test data. These categories of data may be simultaneously requested or sequentially requested. Some tests may not be performed, or some data not received because of the poor condition of the circuit. For instance, a circuit on which the customer premises equipment does not appear to be properly connected will not generate transmission rate data. At least some of the data received is stored in memory. The received data or evaluations of the received data is stored in one or more test result vectors, which we mean data structures with a physical or logical relationship among data elements, designed to support data manipulation functions, per the IEEE definition of data structure. We do not mean for the test result vectors or the diagnostic vectors mentioned below to be limited to a particular kind of data structure, such as array or data object. We recognize that the test data may store a "good" or "bad" evaluation of the data, for instance after measured loop length has been tested against loop length parameter, instead of storing the measurement itself. The method continues with analyzing the test result vectors against a plurality of diagnostic vectors in a rule base, selecting at least one diagnosis vector (another data structure), and reporting the selected diagnosis vector or a diagnosis based on the selected diagnosis vector. The dispatch report may be directed to a user in a human perceptible form or to another computer system as intermediate data leading to a successive step.

A further aspect of this technology includes generating a dispatch report from the selected diagnosis vector, which dispatch report identifies at least one most likely diagnosis and one or more potential actions to resolve the diagnosis. The dispatch report may be directed to a user in a human perceptible form or to another computer system as intermediate data leading to a successive step, such as automated scheduling of dispatches. A further aspect may include submitting dispatches from the dispatch report to an automated dispatching system, without requiring technician review of the automatically generated diagnoses.

An extended automatic data collection embodiment may include automatically eliciting and electronically receiving network access provider connectivity test data. The method may include storing at least some the NAP connectivity test data in the test result vectors.

An extended adaptive data collection embodiment may include automatically eliciting and electronically receiving provisioned configuration data from the DSLAM and/or inventory data from customer service records that describes a configuration for the DSL circuit and using the provisioned configuration and/or inventory data to set parameters for evaluating other data received from the DSLAM and/or the probe. This embodiment may be combined with either of the method embodiments above.

For instance, this data may be data used to set parameters for eliciting the narrowband or wideband measurement data.

The data can be described more particularly, although it is believed that one of skill in the art, upon reading this specification, will understand the categories of performance, narrowband, synchronization and wideband data. The performance data may include at least DMT profile parameters and circuit status. The narrowband measurement data may include at least loop length measurements, and line properties of balance, resistance and voltage. The wideband measurement data may include at least load coil detection, bridged tap detection and spectral noise measurements. These narrowband and wideband measurement may be combined with others listed in the sample rule base described above. The NAP connectivity test data may be based on the probe emulating to the DSLAM a subscriber's DSL modem. In this mode, the test data includes at least results of pinging a network component coupled to the DSLAM, testing connectivity to the network access provider and pinging a selected IP address. The network component coupled to the DSLAM may be an ATM component or another type of router. For instance, it may be an edge router. The selected IP address may be reached via the DSLAM, network component and network access provider.

The diagnostic vectors may include at least pass, fail or not applicable criteria for at least bit rates achieved, counts of FEC code violations, loop length, line properties of balance, resistance and voltage, synchronization of near and far end units with the probe, load coil detection, bridge tap detection, spectral noise and attenuation. In addition to pass, fail and n/a, more specific criteria such as "idle" for customer premises equipment synchronization may be included in the diagnostic vectors and may be collected electronically or derived from data collected electronically.

A further aspect may include repeatedly analyzing DSL circuit and submitting at least some diagnoses to an automated dispatching system, without requiring technician review of the automatically generated diagnoses.

In some embodiments, the diagnostic vectors are ordered, and the comparison of the results vector to the diagnostic vectors uses the ordering to select the diagnosis vector.

In other embodiments, the comparing of the test results vector to the rule base may be implemented by a hierarchy or network of logical tests compiled from the rule base. By compiled, we mean generated using a tool, so that the rule base is maintained and the logical tests are reliably derived from the rule base. For instance, a series of if-then-else statements can be generated from the automated analysis of the rule base. The generation from rule tables of if-then-else and of similar program statements should be readily understood by programmers.

The method embodiments described above may alternatively be practiced as a computer implemented diagnostic system. A useful environment for the system includes an operator or computer process that specifies the DSLAM and DSL circuit to be tested, at least one probe from which the system can elicit and receive test data for the DSL circuit and a user or computer system to which results can be reported. The system itself includes an input component that receives electronically a DSL circuit identification for a DSL circuit to be analyzed, wherein the DSL circuit is coupled to a DSLAM or a remote terminal (collectively referred to as the "DSLAM"). It further includes a data collection component and a port coupled to the data collection component and adapted to communicate with the DSLAM and at least one probe that is coupled to the DSL circuit. The data collection component is adapted to automatically elicit and electronically receive: performance data from the DSLAM for the DSL circuit; narrowband measurement data from the probe; upstream and downstream synchronization data from the probe; and wideband measurement data from the probe. The device further includes computer readable memory coupled to the data collection component containing one or more test result vectors in which the data collection component stores at least some of the received data or evaluations of the received data and containing a plurality of diagnostic vectors in a rule base. It includes an analysis and reporting component coupled to the computer readable memory that analyzes the test result vectors against the plurality of diagnostic vectors, selects at least one diagnostic vector based on the analysis and reports the selected diagnosis vector or a diagnosis based on the selected diagnosis vector. The analysis and reporting component is further adapted to generate a dispatch report based on the selected diagnosis vector or a diagnosis based on the selected diagnosis vector.

The dispatch report may identify at least one most likely diagnosis and one or more potential actions to resolve the diagnosis. Alternatively, the dispatch report may include two or more alternative diagnoses based on the selected diagnosis vector and report relative likelihoods of the alternative diagnoses.

The data collection component may be further adapted to automatically elicit and electronically receive provisioned configuration data from the DSLAM and/or inventory data from customer service records that describes a configuration for the DSL circuit and to use the provisioned configuration and/or inventory data to set parameters for evaluating other data received from the DSLAM and/or the probe; and to automatically elicit and electronically receive network access provider (abbreviated "NAP") connectivity test data from the probe and store at least some of the NAP connectivity test data in the one or more test result vectors The aspects and embodiments of the method can all readily be combined with the computer implemented diagnostic system.

The method embodiments described above also may alternatively be practiced as an article of manufacture. In some embodiments, the article of manufacture is a computer readable storage media that contains computer instructions that run adapted to be run on a diagnostic device. In other embodiments, the article of manufacture is a digital signal that includes same functional content that can be impressed onto a computer readable storage media. The computer readable storage media holds computer program instructions adapted to carry out the method embodiments described above and their various aspects. Alternatively, the computer readable storage media holds computer program instructions that can be combined with hardware to build the diagnostic system described above. Again, a digital signal can hold and can convey the same computer program instructions as a computer readable storage media. Another method, closely akin to the digital signal embodiment, is a method of manufacturing a diagnostic device by loading functional computer program instructions into the memory of diagnostic device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. An automated, computer-implemented method of analyzing a DSL circuit (including an SDSL, ADSL, ADSL2+, BDSL2, VDSL or VDSL2 circuit) in response to a trouble ticket, the method including:
   receiving electronically a DSL circuit identification for a DSL circuit to be analyzed, wherein the DSL circuit is coupled to a DSLAM or a remote terminal (collectively referred to as the "DSLAM");
   for the DSL circuit, automatically eliciting and electronically receiving:
      performance data from the DSLAM for the DSL circuit;
      narrowband measurement data from at least one probe that is coupled to the DSL circuit;

upstream and downstream synchronization data from the probe; and wideband measurement data from the probe;

storing at least some of the received data or evaluations of the received data in one or more test result vectors; and analyzing the test result vectors against a plurality of diagnostic vectors in a rule base, selecting at least one diagnostic vector based on the analysis and reporting the selected diagnosis vector or a diagnosis based on the selected diagnosis vector.

2. The method of claim 1, further including:

generating a dispatch report based on the selected diagnosis vector that identifies at least one most likely diagnosis and includes one or more potential actions to resolve the diagnosis.

3. The method of claim 2, wherein the dispatch report includes two or more alternative diagnoses based on the selected diagnosis vector and reports relative likelihoods of the alternative diagnoses.

4. The method of claim 1, further including, for the DSL circuit:

automatically eliciting and electronically receiving provisioned configuration data from the DSLAM and/or inventory data from customer service records that describes a configuration for the DSL circuit and using the provisioned configuration and/or inventory data to set parameters for evaluating other data received from the DSLAM and/or the probe; and network access provider (abbreviated "NAP") connectivity test data from the probe and storing at least some of the NAP connectivity test data in the one or more test result vectors.

5. The method of claim 1, further including, for the DSL circuit automatically eliciting and electronically receiving provisioned configuration data from the DSLAM and/or inventory data from customer service records that describes a configuration for the DSL circuit and using the provisioned configuration and/or inventory data to set parameters for evaluating other data received from the DSLAM and/or the probe.

6. The method of claim 1, further including, for the DSL circuit:

automatically eliciting and electronically receiving network access provider (abbreviated "NAP") connectivity test data from the probe; and storing at least some of the received data in the one or more test result vectors.

7. The method of claim 4, wherein the provisioned configuration and/or inventory data includes at least DMT profile parameters and circuit status.

8. The method of claim 4, wherein the DSL circuit narrowband measurement data includes at least loop length measurements, and line properties of balance, resistance and voltage.

9. The method of claim 8, wherein the DSL circuit wideband measurement data includes at least load coil detection, bridged tap detection and, spectral noise measurements.

10. The method of claim 9, wherein the DSL circuit NAP connectivity test data is based on the probe emulating to the DSLAM a subscriber's DSL modem and includes at least results of pinging an ATM component coupled to the DSLAM, testing connectivity to the NAP and pinging a selected IP address reached via the DSLAM, ATM and NAP.

11. The method of claim 1, wherein the diagnostic vectors include at least pass, fail or not applicable criteria for at least bit rates achieved, counts of FEC code violations, loop length, line properties of balance, resistance and voltage, synchronization of near and far end units with the probe, load coil detection, bridge tap detection, spectral noise and attenuation.

12. The method of claim 4, wherein the diagnostic vectors include values for at least bit rates achieved, counts of FEC code violations, loop length, line properties of balance, resistance and voltage, upstream and downstream synchronization with the probe, load coil detection, bridge tap detection, spectral noise, attenuation, ATM ping response, NAP authentication, and IP-site ping response.

13. The method of claim 10, wherein the diagnostic vectors include at least pass, fail or not applicable criteria for at least bit rates achieved, counts of FEC code violations, loop length, line properties of balance, resistance and voltage, upstream and downstream synchronization with the probe, load coil detection, bridge tap detection, spectral noise, attenuation, ATM ping response, NAP authentication, and IP-site ping response.

14. The method of claim 4, repeatedly receiving and following through on DSL circuit identifications and testing, and providing at least some of the selected diagnosis vectors or the diagnoses based on the selected diagnosis vectors to an automated dispatch scheduling system without manual review for automatic scheduling of dispatches.

15. The method of claim 4, wherein the diagnostic vectors are ordered and the comparison of the results vector to the diagnostic vendors uses the ordering to select the diagnosis vector used to generate the dispatch report.

16. The method of claim 4, wherein the comparing the test results vector to the rule base is implemented by a hierarchy or network of logical tests compiled from the rule base.

17. A computer implemented diagnostic system that analyzes a DSL circuit (including an SDSL, ADSL, ADSL2+, BDSL2, VDSL or VDSL2 circuit) by communicating with a DSLAM and a probe coupled in communication with the DSL circuit, the system including:

an input component that receives electronically a DSL circuit identification for a DSL circuit to be analyzed, wherein the DSL circuit is coupled to a DSLAM or a remote terminal (collectively referred to as the "DSLAM");

a data collection component;

a port coupled to the data collection component and adapted to communicate with the DSLAM and at least one probe that is coupled to the DSL circuit;

wherein the data collection component is adapted to automatically elicit and electronically receive:

performance data from the DSLAM for the DSL circuit;

narrowband measurement data from the probe;

upstream and downstream synchronization data from the probe; and wideband measurement data from the probe;

computer readable memory coupled to the data collection component containing one or more test result vectors in which the data collection component stores at least some of the received data or evaluations of the received data and containing and a plurality of diagnostic vectors in a rule base; and an analysis and reporting component coupled to the computer readable memory that analyzes the test result vectors against the plurality of diagnostic vectors, selects at least one diagnostic vector based on the analysis and reports the selected diagnosis vector or a diagnosis based on the selected diagnosis vector.

18. The system of claim 17, wherein the analysis and reporting component further generates a dispatch report based on the selected diagnosis vector that identifies at least one most likely diagnosis and includes one or more potential actions to resolve the diagnosis.

19. The system of claim 18, wherein the dispatch report includes two or more alternative diagnoses based on the selected diagnosis vector and reports relative likelihoods of the alternative diagnoses.

20. The system of claim 17, wherein the data collection component further:
- automatically elicits and electronically receives provisioned configuration data from the DSLAM and/or inventory data from customer service records that describes a configuration for the DSL circuit and uses the provisioned configuration and/or inventory data to set parameters for evaluating other data received from the DSLAM and/or the probe; and
- automatically elicits and electronically receives network access provider (abbreviated "NAP") connectivity test data from the probe and stores at least some of the NAP connectivity test data in the one or more test result vectors.

21. A non-transitory computer readable storage media including computer instructions adapted to run on a diagnostic device and to:
- receive electronically a DSL circuit identification for a DSL circuit to be analyzed, wherein the DSL circuit is coupled to a DSLAM or a remote terminal (collectively referred to as the "DSLAM");
- for the DSL circuit, automatically elicit and electronically receive:
  - performance data from the DSLAM for the DSL circuit;
  - narrowband measurement data from at least one probe that is coupled to the DSL circuit;
  - upstream and downstream synchronization data from the probe; and
  - wideband measurement data from the probe;
- store at least some of the received data or evaluations of the received data in one or more test result vectors; and
- analyze the test result vectors against a plurality of diagnostic vectors in a rule base, selecting at least one diagnostic vector based on the analysis and report the selected diagnosis vector or a diagnosis based on the selected diagnosis vector.

* * * * *